United States Patent [19]
Dyck

[11] 3,776,463
[45] Dec. 4, 1973

[54] PLASTIC HOSE, RISER AND CLAMPING SYSTEM

[75] Inventor: Gerhard J. Dyck, Saskatoon, Canada

[73] Assignee: Dyckes Sprinkler Co. Ltd., Saskatchewan, Canada

[22] Filed: July 12, 1972

[21] Appl. No.: 270,995

[30] Foreign Application Priority Data
July 23, 1971 Canada .............................. 118952

[52] U.S. Cl. .................... 239/204, 239/600, 285/5, 285/197, 285/302
[51] Int. Cl. .......................................... B05b 15/10
[58] Field of Search .................... 239/204, 600, 206, 239/203; 285/302, 197, 5, 6, 328

[56] References Cited
UNITED STATES PATENTS
2,968,440  1/1961  Cone ............................... 285/302 X
3,537,471  11/1970  Houle ............................. 285/302 X Primary Examiner—Richard A. Schacher
Attorney—Paul M. Craig, Jr. et al.

[57] ABSTRACT

A composite assembly including as essential elements a plastic material conduit, a novel riser assembly and a spray nozzle is provided. The conduit is provided with a hollow stem. The novel riser assembly includes a finite length of plastic tubing having one outwardly flared end. That end is adapted to be secured to, and envelope, the hollow stem on the conduit. The other end of the plastic tubing is inwardly tapered. That end is adapted to be secured to, and envelope, a sprinkler head stem. A self-threading hollow collar hose clamp is associated with each end of the plastic tubing, each hose clamp being tapered or flared to conform to the taper or flare at the respective end of the tube. The outer periphery of the hose clamp is provided with hand grip means, while the inward tapered or flared interior periphery of each hose clamp is provided with a thread includng helically disposed ridges separated by flat areas.

15 Claims, 6 Drawing Figures

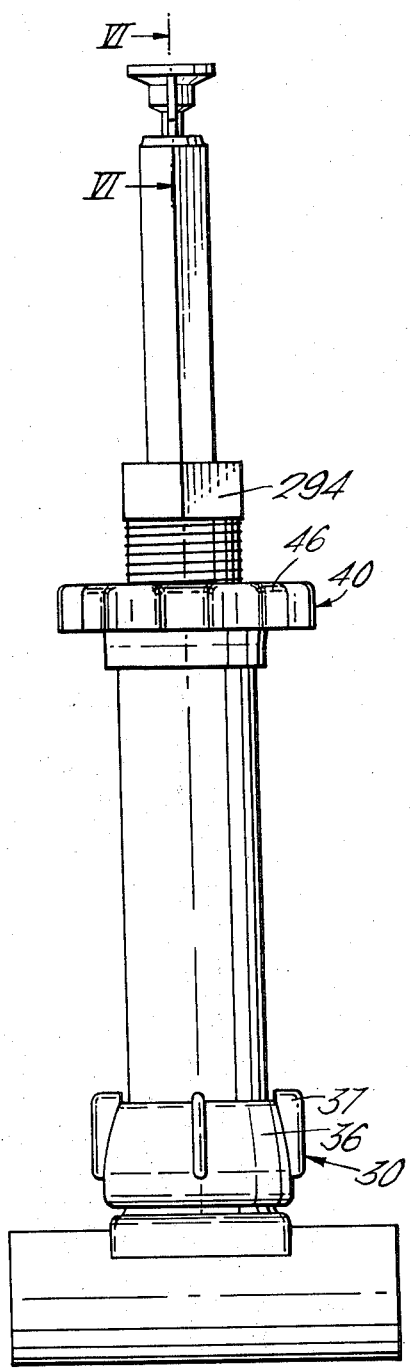
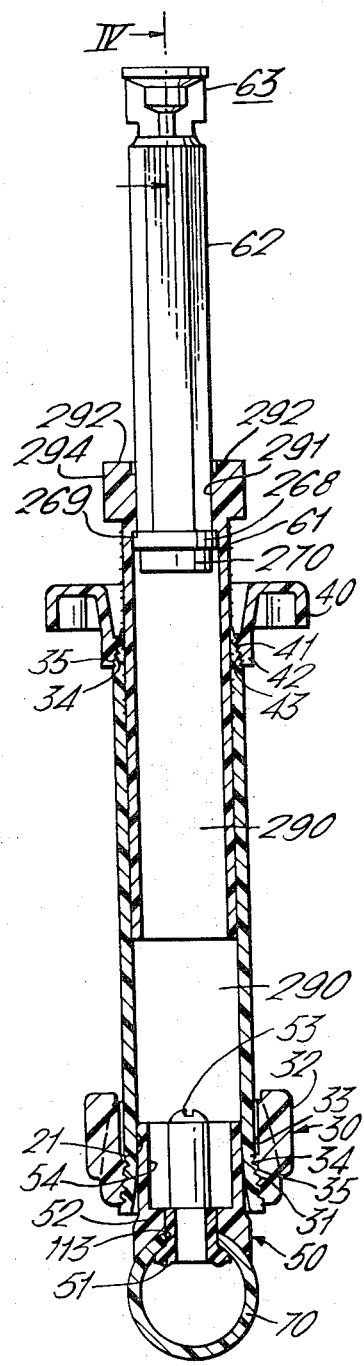

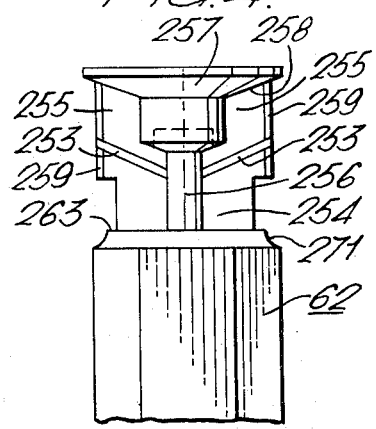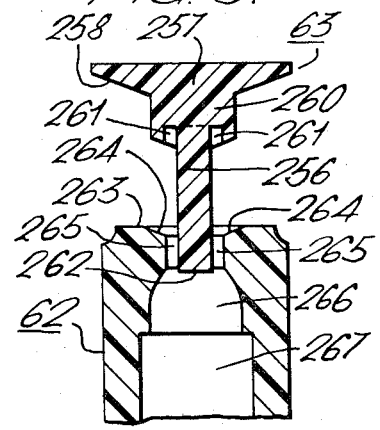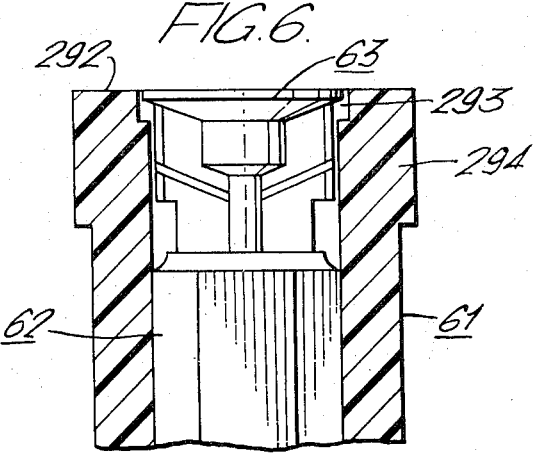

PLASTIC HOSE, RISER AND CLAMPING SYSTEM

FIELD OF THE INVENTION

This invention relates to a plastic conduit riser assembly and certain components thereof. More particularly, it relates to components for joining a plastic riser pipe onto a particular type of plastic conduit, namely, one which is specially adapted for use in underground sprinkler systems. In addition to providing means to secure the riser pipe to the plastic conduit, the present invention also provides structural elements to secure a special form of sprinkler to the riser pipe.

DESCRIPTION OF THE PRIOR ART

Sprinkler systems are presently available which include a plurality of plastic pipes or conduits for conveying the water and riser pipes connected to "Tees" on the plastic conduit and to which are attached the sprinkler heads. Difficulty is experienced in constructing such systems, since, in the past, the "Tee" connections had to be secured to the end finite length section of the plastic conduits, then the riser pipe had to be secured to the "Tee" and finally the sprinkler head or nozzle had to be secured to the upper end of the riser. It is readily seen that a considerable amount of thread forming, then securement, is necessary. If securement is not effected by threaded attachment, fusing or other securement in situ is necessary.

The present applicant has already proposed a solution to the problem of a conveniently secured, simple effective sprinkler head, and this is disclosed and claimed in Canadian Patent No. 773,960. In addition, applicant has already proposed a solution to the problem of formation and assembly of the "Tees" in his pending U.S. Pat. Application Ser. No. 882,203 filed Dec. 4, 1969, directed to saddle-type tee connectors.

AIMS OF THE PRESENT INVENTION

By the present invention, the applicant now proposes to minimize the problems involved in assembling the entire composite plastic assembly of conduit, riser and sprinkler head.

SUMMARY OF THE INVENTION

BROAD STATEMENT OF THE INVENTION

Accordingly, by a broad aspect of this invention, an assembly is provided including the following elements: Firstly, there is a conduit having a hollow stem associated therewith. Secondly, there is a finite length of plastic tubing. One end of the tubing is outwardly flared and that end is adapted to be secured to, and envelope, the hollow stem. The other end of the tubing is inwardly tapered and that end of the tube is adapted to be secured to, and envelope, a sprinkler head stem. Finally, a self-threading hollow collar hose clamp is provided to be associated with each end of the tube. Each hose clamp is inwardly tapered or flared to conform to the taper or flare at the respective end of the tube. The outer periphery of each of the hose clamps is provided with hand grip means. The tapered or flared interior periphery of each of the hose clamps is provided with a thread, such thread including helically disposed ridges separated by flat areas.

GENERAL DESCRIPTION OF THE INVENTION

The hose clamps provided in the combination of this invention are designed so as to compress portions of the plastic tubing as the hose clamp is being rotated to a locking position, but this compressing does not distort the plastic tubing out of round. The plastic tubing may be formed e.g. of polyethylene or polypropylene. The hose clamps are strong and easy to manufacture from a suitable hard plastics material, e.g., nylon or ABS. The hose clamps may be securely tightened by hand torque and no other tools are necessary. The hose clamp includes, as an essential feature thereof, the provision of tapered self-threading thread which can self-thread and lock onto the semi-rigid plastic tubing. The hose clamp may be of any suitable size, since it can be used on any suitably sized semi-rigid tubing.

The thread is not a full thread so as not to damage the plastic tubing which is thin walled, e.g. thin wall polyethylene tubing. The thread is specially designed to bite into the tubing only deep enough to force a taper onto the pipe and thereby to compress the pipe. The flat area between the helically threaded areas serves as a compression area. Since the thread is not a full "V" thread, the hose clamp does not have to be screwed onto the plastic tubing as far as the full "V" thread. The thread used may be a single lead thread. However, a multiple start, male thread may also be used since it has the advantage of less torque motion since the thread lead is greater.

Any type of hollow stem can be secured to the conduit or plastic pipe, such as, for example, conventional "Tees" and conventional saddles. However, the hollow stem associated with the conduit or plastic tube is preferably the saddle-type tee connector of the above-identified patent application, including an inner component securable to the inside of the conduit or plastic tube and having a hollow post projecting through a hole in the conduit or plastic tubing. An outer component includes a hollow stem to engage the hollow post of the inner component and to be secured thereto by means within the confines of the hollow stem. This securement provides a substantially water-tight seal at the hole in the conduit.

The hollow stem can alternatively be one of a plurality of integral "Tee" connectors, as disclosed and claimed in U.S. Pat. Application Ser. No. 864,613 filed Oct. 8, 1969. Finally, the hollow stem can be part of a conventionally provided "Tee" or elbow connection.

Any type of sprinkler head may be secured to the riser assembly of aspects of this invention. Thus, the sprinkler head may be any of the conventional so-called "pop-up" sprinkler heads. Preferably, however, it is a specially designed novel "pop-up" sprinkler head including an externally threaded sleeve so that the height of the sleeve atop the riser can be adjusted. Freely slidably mounted within the sleeve is a casing whose upward movement is limited by abutting surfaces, and whose downward movement is limited by being flush with the top of the sleeve. Atop the casing is a sprinkler deflector head, with apertures below the head to direct water at the head, to be deflected away following a predetermined pattern. Preferably, the head is integral with the casing and the deflection pattern is governed by a vertically bisected area below the head.

DESCRIPTION OF THE DRAWINGS

BRIEF DESCRIPTION OF THE DRAWINGS

Figure 1:
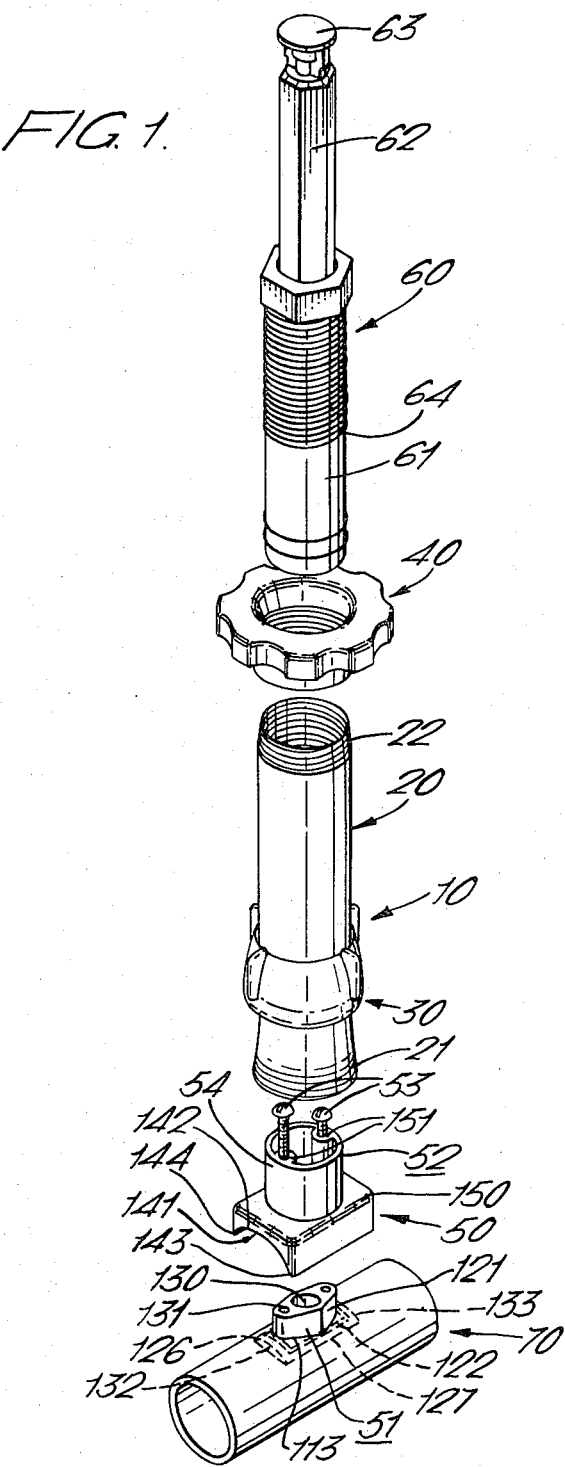

In the accompany drawings,

FIG. 1 is an exploded perspective view of the assembly of one aspect of the present invention;

FIG. 2 is a side elevation of the assembly of FIG. 1;

FIG. 3 is a central longitudinal section along the line III—III of FIG. 2;

FIG. 4 is an enlarged view of a portion of the sprinkler head shown in FIG. 3;

FIG. 5 is a longitudinal, enlarged cross-section along the line V—V of FIG. 3; and FIG. 6 is a longitudinal, enlarged cross-section along the line VI—VI of FIG. 2.

DETAILED DESCRIPTION OF FIG. 1

The elements of the present inventive assembly 10 include a riser pipe 20, a lower hose clamp 30 and an upper hose clamp 40. Associated with the assembly 10 is a saddle-type tee connector 50 to provide a tee connection having a hollow stem 145 to which the bottom of the riser pipe 20 is secured. Also associated with the assembly 10 is a sprinkler assembly 60.

The riser pipe 20, formed e.g. of polyethylene, includes an outward flare 21 at the lower area, and an inward taper 22 at the upper area. The riser pipe 20 is initially unthreaded, but becomes threaded as the hose clamps 30, 40 are secured thereto.

The lower hose clamp 30 is provided with an inwardly tapered inside peripheral surface 31 (the inward taper being "inward" when viewed from the outer face 32 to the inner face 33). The inner peripheral surface 31 is provided with a triple helically arranged thread 34 with a flat compression area 35 spaced between. The outer peripheral surface 36 is provided with a plurality of hand-gripping ears 37.

The upper hose clamp 40 is similar to the lower hose clamp 30 with the exception that the inside peripheral surface 41 is outwardly flared (the outward flare being "outward" when viewed from the outer face 42 to the inner face 43). The inner peripheral surface 41 is likewise provided with a triple helically arranged thread 34 with a flat compression area 35 spaced between. The outer peripheral surface 46 is provided with a plurality of gripping projections 47.

The saddle-type tee connector 50 includes an internal component 51 which is disposed within the tube or conduit 70 and an outer saddle 52 disposed on the outside of the tube 70 and is secured thereto by means of screws 53. The outer saddle 52 includes an upper hollow connecting stem 54 which is adapted to be enclosed by the lower area 21 of the riser pipe 20.

In the exploded view, as shown in FIG. 1, the tube 70 has attached thereto a saddle-type tee fitting 50 including an internal component 51, which is disposed in the interior of the tube 70 and which also protrudes through an aperture 113 in the circumferential side wall of the tube 70, and an outer saddle 52 which sits on the circumferential exterior wall of the tube 70 and mates with the internal component 51.

DETAILED DESCRIPTION OF SADDLE-TYPE TEE FITTING

The construction of the internal component 51 is more completely described in the above-identified U.S. Pat. Application Ser. No. 882,203. The structure may, however, briefly be seen in FIGS. 1, 2 and 3 herein. It is seen that the internal component 51 includes a generally rectangular base 120 having an upstanding, substantially boat-shaped pedestal or hollow post 121 integral therewith. The upper surface of the generally rectangular base 120 is of convex form, and it includes sealing flanges 122 extending around the perimeter, or peripheral edges thereof, spaced slightly inwardly from the longitudinally extending side edges 126, 127 and transversely extending leading and trailing edges 132, 133. Thus, there is provided a pair of longitudinally extending, upper, convex surfaces terminating in longitudinally extending side edges 126, 127.

The boat-shaped pedestal or hollow post 121 is provided with a fluid-conducting aperture 130 disposed along the central, vertical axis thereof, flanked by a pair of fastening apertures 131 extending axially parallel to fluid-conducting aperture 130.

The construction of the outer saddle 52 is also more completely described in the above-identified U.S. Pat. Application Ser. No. 882,203. The structure may, however, briefly be seen in FIGS. 1 and 3 herein. It is seen that the outer saddle 52 includes a generally rectangular base 150 provided with a convex face 142 forming the longitudinally extending lower surface 141. The longitudinally extending lower surface 141 terminates at a pair of longitudinally extending side edges 143 and 144 which are adapted to form the limit of the contact between the outer saddle 52 and the tube 70.

The outer saddle 52 is provided with a substantially cylindrically-shaped upstanding male connecting stem 54. The generally rectangular base 140 is provided with a substantially boat-shaped internal well 149 disposed along the central longitudinal axis thereof. The well 149 is connected to a substantially cylindrical second well 147, the cylindrical second well terminating in a pair of ledges 148. Disposed within the confines of the cylindrical second well 147 is a pair of axially extending, generally cylindrical lugs 151, each provided with an axial screw hole. The axially extending, generally cylindrical lugs 151 are adapted to extend downwardly only as far as the ledges 148. Wells 147 and 149 provide the fluid-conducting aperture between the interior of tube 70 and riser pipe 20.

The manner in which the saddle-type tee fitting, namely internal component 51 and outer saddle 52, is secured to the tube 70 for providing the riser 20 coupled thereto will now be described. It is seen that the internal component 51 is disposed with its pedestal 121 extending through the aperture 113 in the side wall of the tube 70. The aperture 113 is preferably of exactly the same shape as the cross-section of the pedestal 121. In this position, the convex face 125 of the upper surface of the generally rectangular base 120 is adapted to be in engagement with the concave inner surface 136 of the tube 70. The sealing flange 122 is in more direct contact with the convex inner surface 136 of the tube 70 to provide more positive fluid-tight sealing engagement between the generally rectangular base 120 and the tube 70.

The outer saddle 52 is disposed over the internal component 51 with the well 149 thereof mating with the pedestal 121 of the internal component 51. It is, therefore, preferred that the well 149 have substantially the same cross-sectional shape as the cross-section of the pedestal 121, i.e. be similar but slightly smaller. In this way, there is positive frictional engagement between the sealing surface 134 of the pedestal 121, and the sealing surface 135 of the well 149. While applicant has shown these surfaces to be substantially smooth with sealing provided by a slightly larger size of the pedestal 121 when compared to the well 149, other means of providing more positive sealing engagement between the sealing surface 134 of pedestal 121 and the sealing surface 135 of well 149 may be provided. Such enhanced sealing means as ribs, projections, etc. may be used. These are not shown since it is believed that such enhanced sealing engagement means would be well known to those skilled in the art.

In order more positively to couple the outer saddle 52 to the internal component 51, a pair of securement screws 53 is disposed through the apertures in the cylindrical lugs 151 of the outer saddle 52, the screws 53 being in self-tapping engagement with the aperture 131 in the pedestal 121 of the internal component 51. The riser 20 is coupled to the saddle-type tee connector 50 by being disposed over the male connecting stem 54 and then being secured thereto in a manner to be described hereinafter.

The positioning of the securement screws 53 within the confines of the riser 20 is of inherent advantage since any leakage of fluid through the connecting apertures 131, 151 would inherently be led to the riser 20 and hence any undesirable effect of such leakage would be cancelled. Furthermore, it is noted that the internal component 51 includes a pedestal 121 which extends through a similarly shaped aperture 113 in the side of the tube 70, thereby minimizing any twisting of the tube 70 when the outer saddle 52 is attached to the internal component 51, if there should be any application of torsional forces to the riser 20 attached thereto. This also is of inherent advantage.

The nozzle 60 includes a sleeve 61 of substantially cylindrical cross-section including a nozzle casing 62 of substantially hexagonal cross-section and a superposed integral spray head 63. The sleeve 61 is provided with external threads 64 and gripping rings 65 by means of which the nozzle 60 is retained within and disposed at a preset level within the riser pipe 20.

DETAILED DESCRIPTION OF "POP-UP" SPRINKLER HEAD

FIGS. 2 – 6 inclusive illustrate more clearly the construction of a so-called "pop-up" sprinkler head which may be used in the combination of the present invention. The nozzle 60 includes a valve head 63 integral with the hexagonal (in cross-section) casing 62, which is slidably mounted in sleeve 61. The valve head 63 includes a valve stem 256 terminating in a deflection head 257 having a slightly frusto-conical bottom surface 258. A central partition 254 is provided which divides the valve stem 256 in half and extends radially to provide a pair of opposing ears 255. The ears 255 are each provided with an upwardly sloping water directing channel 253 extending from the valve stem 256 to the lateral edge 259 of the ear 255.

The undersurface of the deflection head 257 includes an enlarged cylindrical portion 260 having two semi-annular water deflection chambers 261 formed around the stem 256, the chambers being separated by partition 254.

The base 262 of the valve stem 256 is integral with a flat base 263. Base 263 is inset by a pair of semi-circular depressions 264, separated by partition 254, each of depressions 264 being provided with a plurality of water flow passages 265. Below the depressions 264 within the casing 62 is a generally frusto-conical sluice 266 to conduct the water from the interior 267 of the casing 62 to the flow passages 265.

Casing 62 is also provided with a lower annular flange 268 which is designed to abut internal shoulder 269 in the sleeve 61 to prevent the casing 62 from being urged completely out of the sleeve 61. A metal collect 270 is inserted into the interior 267 of the casing 62 to provide both a passageway for water to pass from the interior 290 of sleeve 61 to the interior 267 of casing 62, and a weight to maintain the casing 62 in its lowermost position when at rest. The hexagonal (in cross-section) casing 62 meets the circular (in cross-section) base 263 by means of an inwardly flared portion 271.

The central aperture 291 in sleeve 61 within which hexagonal (in cross-section) casing 62 slides is of circular cross-section, but it is provided with internal scalloped edges (not shown) and leakage of water through aperture 291 is minimized by cooperation between the upper surface of flage 268 and internal shoulder 269. The upper surface 292 of sleeve 61 is countersunk at countersink 293 to accommodate deflection head 257 so that, at rest, both upper surfaces are flush. The central aperture 291 is of large enough diameter to accommodate ears 255.

The means for fastening the casing 62 to the pipe riser 20 is also shown. The hexagon (in cross-section) casing 62 is contained inside the threaded sleeve 61 as described above, so that it may slip freely up and down within the sleeve 61, its upper limit being set by cooperation between annular flange 268 and internal shoulder 269, and its lower limit being set by cooperation between deflection head 257 and countersink 293. Sleeve 61 includes a hexagonal (in cross-section) head 294 to assist in threading it into riser 20 which is attached, as described hereinabove, to the water line or tube 70. The threaded sleeve 61 serves two functions, namely, assuring a free rising and falling of the sprinkler casing 62, and allowing the height of the casing 62 to be adjusted.

DESCRIPTION OF ASSEMBLY

To secure the assembly, the lower hose clamp 30 is slipped over the upper end 22 of the riser pipe 20, the lower end 21 is placed around the hollow post 54 and the lower hose clamp 20 turned by hand until it is firmly secured with the tapered portion compressing against the post 54.

The upper hose clamp 40 is slipped over the upper end 22 of the riser pipe 20 and the nozzle 60 threaded down the riser pipe 20 to the desired level. Then the upper hose clamp 40 is threaded by hand downwardly on the pipe riser 20 until the tapered portion compresses the end of the riser 22 against the stem 61.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A riser clamping assembly comprising: a finite length of plastic tubing having two ends thereof, one said end being outwardly flared and being adapted to be secured to, and envelope, a first designated hollow member, the other end being inwardly tapered, and being adapted to be secured to, and envelope, a second designated hollow member; a self-threading hollow collar hose clamp associated with said one outwardly flared end, said hose clamp being inwardly flared to correspond with the outward flare of said one end, the outer periphery of said hose clamp being provided with hand grip means, the inner periphery of said inward flare being provided with threads including helically disposed ridges separated by flat areas; and a self-threading hollow collar hose clamp associated with said other inwardly tapered end, said hose clamp being inwardly tapered to correspond with the inward taper of said other end, the outer periphery of said hose clamp being provided with hand grip means, the inner periphery of said inward taper being provided with threads including helically disposed ridges separated by flat areas.

2. The assembly of claim 1 wherein the hose clamps are each provided with a shallow, single or multiple, female thread including three raised helices.

3. In combination: a conduit having a hollow stem associated therewith; a sprinkler head including a stem; and a riser clamping assembly, said assembly comprising: a finite length of plastic tubing, having two ends thereof, one said end being outwardly flared and being adapted to be secured to, and envelope, said hollow stem, the other said end being inwardly tapered and being adapted to be secured to, and envelope, said sprinkler head; a self-threading hollow collar hose clamp associated with said one outwardly flared end, said hose clamp being inwardly flared to correspond with the outward flare of said one end, the outer periphery of said hose clamp being provided with hand grip means, the inner periphery of said inward flare being provided with threads including helically disposed ridges separated by flat areas; and a self-threading hollow collar hose clamp associated with said other inwardly tapered end, said hose clamp being inwardly tapered to correspond with the inward taper of said other end, the outer periphery of said hose clamp being provided with hand grip means, the inner periphery of said inward taper being provided with threads including helically disposed ridges separated by flat areas.

4. The combination of claim 3 wherein said conduit having a hollow stem is a "Tee", comprising: an internal component including a base sealingly engageable with the interior wall of the conduit and including a post projecting through an aperture in the wall of the conduit; and an external saddle connected thereto including a base sealingly engageable with the exterior wall of the conduit, a well surrounding the projecting post, and a hollow stem projecting upwardly therefrom.

5. The combination of claim 4 wherein said outer saddle is connected to said internal component by screws passing within the confines of said hollow stem.

6. The combination of claim 5 wherein said sprinkler head is a pop-up nozzle including a sleeve securable to said plastic tubing and a casing slidable within said sleeve.

7. The combination of claim 6 wherein said sleeve is provided with external threads; wherein said casing is slidable between an upper limit where an external annular flange on said casing sealingly abuts an internal peripheral ledge on said sleeve, and a lower limit where said sprinkler head is flush with the upper surface of said sleeve in a countersunk cavity; and wherein said sleeve is provided with water passages to direct the water to be deflected off the bottom surface of the sprinkler head.

8. The combination of claim 7 wherein said sprinkler head is integral with said casing; and wherein said sprinkler head includes a pair of dividing, lateral ears.

9. The combination of claim 4 wherein the hose clamps are each provided with a shallow, single or multiple, female thread including three raised helices.

10. The combination of claim 3 wherein said sprinkler head is a pop-up nozzle including a sleeve securable to said plastic tubing and a casing slidable within said sleeve.

11. The combination of claim 10 wherein the hose clamps are each provided with a shallow, single or multiple, female thread including three raised helices.

12. The combination of claim 10 wherein said sleeve is provided with external threads; wherein said casing is slidable between an upper limit where an external annular flange on said casing sealingly abuts an internal peripheral ledge on said sleeve, and a lower limit where said sprinkler head is flush with the upper surface of said sleeve in a countersunk cavity; and wherein said sleeve is provided with water passages to direct the water to be deflected off the bottom surface of the sprinkler head.

13. The combination of claim 12 wherein the hose clamps are each provided with a shallow, single or multiple, female thread including three raised helices.

14. The combination of claim 12 wherein said sprinkler head is integral with the casing; and wherein said sprinkler head includes a pair of dividing, lateral ears.

15. The combination of claim 3 wherein the hose clamps are each provided with a shallow, single or multiple, female thread including three raised helices.

* * * * *